United States Patent [19]

Holowaty et al.

[11] 3,833,343

[45] Sept. 3, 1974

[54] PROCESS FOR PRODUCTION OF CARBON-BEARING SCRAP AND PRODUCT

[75] Inventors: Michael O. Holowaty, Crown Point, Ind.; Harold T. Stirling, Pittsburgh, Pa.

[73] Assignee: Carbo-Scrap, Inc., Gary, Ind.

[22] Filed: May 1, 1972

[21] Appl. No.: 248,946

Related U.S. Application Data

[63] Continuation-in-part of Ser. No. 138,283, April 28, 1971, abandoned.

[52] U.S. Cl. ............ 29/180 R, 29/180 NM, 29/192, 75/44 S, 117/46 CD, 117/100 M
[51] Int. Cl. ............................................. B21c 37/00
[58] Field of Search ..................... 75/44 S, 44 R, 65; 117/46 CA, 46 CB, 46 CC, 49, 135, 100 M; 29/180 R, 180 NM, 192

[56] References Cited
UNITED STATES PATENTS

| | | | |
|---|---|---|---|
| 1,303,799 | 5/1919 | Jarvis | 75/44 R |
| 2,196,172 | 4/1940 | Billings et al. | 117/46 CB |
| 2,620,268 | 12/1952 | Fourmanoit | 117/135 |
| 3,619,262 | 11/1971 | Segura | 117/46 CB |
| 3,690,930 | 9/1972 | Mueller et al. | 117/135 |

*Primary Examiner*—L. Dewayne Rutledge
*Assistant Examiner*—M. J. Andrews
*Attorney, Agent, or Firm*—Fitch, Even, Tabin & Luedeka

[57] ABSTRACT

Scrap or other metal is heated to remove volatilizable contaminants and raise its temperature and then coated with a carbonaceous material to protect the scrap from subsequent oxidation and the entry of contaminants. The coating conditions are such to pyrolyze the carbonaceous material and provide an excellent reducing and/or recarburizing agent when the scrap is used in later refining or melting operations.

10 Claims, No Drawings

PROCESS FOR PRODUCTION OF CARBON-BEARING SCRAP AND PRODUCT

This application is a continuation-in-part of our earlier application Ser. No. 138,283 filed Apr. 28, 1971 now abandoned.

This invention relates to a process for the pretreatment of metallic feed material for metallic refining operations and more specifically to a process for treating scrap metal to remove vaporizable contaminants therefrom and to protect the scrap from oxidation and subsequent entry of any further contaminants while simultaneously providing a reducing and/or recarburizing agent useful in steel and iron melting operations.

In refining operations to make steel, such as the use of the basic oxygen furnace, it is common practice to first charge scrap and hot metal into a refining apparatus, followed by the addition of limestone and other materials and the performance of the refining operation. On occasion, serious accidents have occurred when the hot metal is brought into contact with the scrap in this and other refining operations, because of the sudden expansion of water or other vaporizable materials that may be trapped in the scrap. Most often, the material will be water that has accumulated in pockets in the scrap during its storage outdoors. The problem is usually most serious when the scrap is made up of sheet shearings, punchings, machine turnings and similar types of relatively thin and usually small pieces of scrap steel which have been compressed into block-like bundles in specially designed hydraulic baling presses and then stored outdoors until needed in a refining operation. Because approximately half of the steel rolled in the United States is in the form of relatively thin, flat, rolled products, large quantities of such scrap are baled in this manner. Other scrap is derived from discarded steel furniture, washing machines, stoves and other outdated consumer goods, automobiles, beams, angles, girders, pipe, obsolete machinery, and even old ships, railroad rails and cars. Such varied sources result in the scrap that is contaminated with different types of unwanted and potentially hazardous materials.

During refining operations, it is necessary to reduce the metal oxides to free metal. For example, the principal reactions which lead to the production of iron from a hematite ore are:

$$Fe_2O_3 + CO \rightarrow 2FeO$$

$$FeO + CO \rightarrow Fe + CO_2$$

$$FeO + C \rightarrow Fe + CO$$

The above reactions occur at varying temperature levels, and the presence of a carbonaceous material is necessary to cause these reactions to take place. It has in the past been proposed to inject auxiliary fuels into metal-refining furnaces, but such a procedure has not proven to be entirely satisfactory.

Accordingly, it is an object of this invention to provide a process for treating metal to provide it with a supplemental reducing and/or recarburizing agent which can be effectively utilized in subsequent metal-refining operations.

A further object of the invention is to provide a process for treating scrap metal to eliminate potential hazards of its subsequent use in operations where it will come in contact with hot molten metal.

A still further object of the invention is to provide a process for treating ferrous scrap metal with carbonaceous material in a manner to effectively remove contaminants and coat the scrap with an adherent coating that forestalls subsequent oxidation and supplies carbon.

Scrap metal destined for feeding to a metal melting operation is heated to a temperature of at least about 500°F. and preferably to at least about 800°F. but below the melting or fusion point of the metal, in order to volatilize any liquid or other foreign materials that may be trapped therein. The heated scrap metal is coated with a protective coating of a liquid carbonaceous material. The scrap should be at a sufficiently high temperature so that it will contain sufficient heat to pyrolyze the carbonaceous material, leaving a strongly adherent residue that is substantially carbon. Substantially complete pyrolysis of the liquid carbonaceous coating material is effected at this time to remove potentially volatile materials, particularly hydrogen which will be present in all organic carbonaceous materials, such as pitch, tar, asphalt and the like. Although pyrolysis can be completed by subsequent heating, it is preferred that the hot metal contain sufficient heat content when coated to pyrolyze the carbonaceous material. The pyrolyzed residue preferably substantially completely encapsulates the scrap metal, appearing as a dull coating that is nearly all carbon. If the coating has a glossy surface, sufficient pyrolysis of the carbonaceous material might not have been carried out, and the temperature of the scrap prior to coating should preferably be increased.

Any available source of metal suitable for use in a refining operation can be employed. Generally scrap iron and steel are used because of their relative abundance. However, prereduced iron pellets or the like which are made by reducing high-grade iron ore to essentially metallic, sponge-like material may also be used.

The scrap should be heated to a temperature of at least about 500°F. but not sufficiently high to cause fusion of the scrap material. Iron alloy scrap, particularly steel, will usually be heated to a temperature between 600°F. and 1,200°F., and preferably in excess of 800°F. The temperature and the total amount of heat applied should be adequate to drive off all volatile materials which may initially contaminate the metal prior to its coating with the liquid carbonaceous material and to provide sufficient heat content to thereafter pyrolyze the liquid coating materials. The temperature is dependent to some extent upon the amount of carbon it is desired to incorporate into the final product, i.e., the greater the amount of carbon, the higher the initial temperature which is used. Temperatures as high as about 1,400°F. may be used to achieve pyrolysis and provide fairly high amounts of carbon in the final product. The preferred range of about 800°F. to about 1,200°F. for steel scrap is most often used to pyrolyze organic carbonaceous coating materials and create the adherent encapsulating coating on the scrap.

Any suitable heating means, such as a traveling grate or a rotary kiln, may be used. Likewise, the source of heat may be hot gases, burners using a liquid or gaseous fuel, or the equivalent. For example, an ignition furnace may be placed above a grate or at the end of a fired kiln. Hot gases may also advantageously be obtained from the exhaust of the refining operation for which the scrap is being prepared; however, in most cases and particularly where there is no direct association with a refining operation, other heating sources will be employed. Relatively light scrap or reduced iron pellets can readily be brought to the desired temperature during a short distance of travel in a kiln. However, scrap such as shredded auto bodies or large already compacted scrap masses may be advantageously heated while moving along a grate.

The intended ultimate use of the coated scrap is usually considered to determine the thickness of coating of the carbonaceous reducing agent which is applied to the hot scrap. If the coated scrap is destined for a refining process wherein a higher carbon percentage is desired, a thicker or multiple coating is applied. A sufficient amount of the carbonaceous material is applied in order to provide a substantially continuous resultant coating on the scrap metal to protect it against subsequent oxidation. The carbonaceous coating material, if a solid or semisolid, is maintained at a temperature above its melting point whether spraying, immersion or some other suitable coating method is used. Generally, the coating material is held between about 200°F. and 800°F., and preferably it is maintained between about 200°F. and about 400°F. to assure good application to the scrap. Temperatures which would cause substantial decomposition or pyrolysis to occur prior to coating are avoided. Preferably the temperature of the scrap is substantially above the temperature of the carbonaceous coating material at the time of its application so that pyrolysis of the carbonaceous material occurs rapidly at the time of its contact with the very hot metal. Although subsequent pyrolysis of the coated material can be effected, the likely loss of carbon as a result of subsequent heating during such a process makes it less desirable.

Because of the relatively light weight of the carbonaceous coating, compared to the weight of the scrap itself, the final weight of the carbonaceous coating may constitute less than 2 percent by weight of the total weight of the coated scrap metal. However, this figure is usually higher because one of the advantages of the invention is its ability to provide coated metal having relatively high carbon percentages. When coating ferrous scrap metal, the resultant carbon coating will generally constitute between about 1 and 20 weight percent of total weight of the coated ferrous scrap.

One simple way of increasing the carbon content of an organic carbonaceous coating material, such as pitch, tar, asphalt, bitumen and the like, is to mix particulate carbon with the liquid organic carbonaceous material. Any suitable particulate carbon may be used, such as anthracite fines, coke breeze, graphite, petroleum coke, char and the like. The percentage of carbon used may vary with the particular liquid organic material used and will also be partially dependent upon the amount of carbon that it is desired to incorporate in the final product. For example, when a 10 weight percent carbon level final product is desired, the particulate carbon may constitute about one-third of the weight of the coating material; whereas for a 20 percent carbon final product, particulate carbon may account for as much as one-half or more of the coating material.

The pyrolysis which is carried out at the time of or subsequent to coating decomposes or "cracks" the organic material driving off most of the volatile compounds. On an atomic basis, hydrogen is probably the major material driven off. Because hydrogen is considered detrimental to ferrous alloys, pyrolysis is generally carried out substantially to completion. Preferably, carbon should constitute at least about 95 percent of the final coating material, and it will usually constitute higher pecentages, depending upon the impurities, such as sulphur, in the organic carbonaceous material employed and the extent of completion of the pyrolysis. Preferably, hydrogen will constitute less than 1 percent of the final pyrolyzed coating. Because the organic materials employed are usually quite low in sulphur content, at least compared to most soft coals from which coke is produced, there are not a great deal of noxious volatiles given off during pyrolysis. Moreover, inasmuch as the process is preferably carried out within a controlled enclosure, such as a rotary kiln, a major portion of the volatiles created can be burned therein. Use can also effectively be made of the heat content of the exhaust gases, as for example by preheating the scrap material as it is being conveyed to the entry to the kiln.

Following pyrolysis of the organic material, the coated scrap will be at a temperature well above the ambient temperature, and advantage can be made of the hot scrap by charging it into a refining or melting operation if both operations are performed on the same premises. When relatively light scrap material is being coated which might or might not be immediately used, such material is advantageously compacted or baled to facilitate its handling prior to its ultimate use. It has been found that, if the hot material being discharged from the kiln is fed directly to a baler or compacter prior to cooling, the resultant bale has additional integrity as a result of the malleableness of the hot coated metal. In those instances, where the coated scrap metal is stored outdoors prior to use in a refining operation, the carbonaceous coating on the scrap excellently protects it from intrusions of moisture from rain and condensation, as well as protecting it against oxidation. The coated scrap provides a synthetic pig iron which can be produced at a lower cost than pig iron which is available from the usual blast furnace and which, at the option of the producer, can be provided with a carbon content much higher than 4 percent when so desired.

The following Examples provide illustrations of the best modes presently contemplated by the inventors for carrying out their invention. However, it is to be understood that these Examples are provided for the purpose of illustration and do not constitute limitations on the invention which is defined by the appended claims.

EXAMPLE I

Ferrous scrap weighing 2,200 pounds is placed on a grate in an 8-inch layer and heated during a 5–10 minute period to an average temperature of 915°F. During the heating period, heat is supplied from an ignition furnace placed above the bed of material, and air is drawn downward through the bed by suction created by a fan connected to a windbox located below the bed of material.

The heated scrap is immersed in a bath of asphaltic material maintained at a temperature of 550°F. The asphaltic material is "Bitumastic No. 2," sold by Koppers Co., Inc. of Pittsburgh.

Upon immersion of the heated scrap in the molten bituminous material, a heavy yellow smoke is emitted from the bath. The scrap is allowed to remain in the bath for approximately 1 minute, after which time it is removed and allowed to cool.

The cooled scrap has a dull, continuous finish, and it can be stockpiled outdoors without significant adverse intrusion of moisture or the like. The coated scrap is considered to be a good feed material for a basic oxygen furnace, an open hearth, a cupola or the like.

EXAMPLE II

Scrap steel from shredded automobile bodies is fed into a rotary kiln some 80 feet in length and about 10 feet in diameter. The material is heated during the first portion of travel in the kiln, for a distance of about 70 feet, in order to raise its temperature to about 1,200°F. Heat is supplied by burners using natural gas or oil to create a flame which extends over a large section of the kiln and creates hot combustion gases which flow through the kiln in countercurrent relation to the travel of the scrap. The exhaust gases leaving the kiln are used to preheat the scrap that is entering it. At a distance about 10 feet from the discharge end of the kiln, the heated scrap material is sprayed with a slurry of tar plus coke breeze, with the coke breeze providing about 20 percent of the mixture. The tar mixture is heated to a temperature of about 270°F. before spraying.

The scrap material is turned over or slowly tumbled in the rotating kiln, and this motion assures uniform coating of the heated scrap material. The rate of spraying and the number of spray nozzles which are utilized determines the thickness of coating deposited on the scrap material. Spraying is performed in a region extending for several feet of the length of the kiln, and a coating about 0.05 inch thick of the carbonaceous mixture is deposited uniformly on the scrap.

The heat content of the 1,200°F. steel scrap causes pyrolysis of the tar to occur as it comes in contact with the surface of the scrap steel. The volatiles which are given off are substantially burned in the kiln adding to the heat needed to bring the scrap to coating temperature. The pyrolyzed tar plus the carbon from the coke breeze provides a strongly adherent, baked-on coating which is at least about 98 percent carbon.

The scrap has a dull finish coating which substantially completely encapsulates the steel scrap. The final coated scrap is about 5 percent by weight carbon. The coated scrap can be immediately fed to a refining operation or it can be stored outdoors for long periods of time without the occurrence of any significant rusting.

Carrying out the pyrolysis of the tar mixture within the rotary kiln allows complete control of the volatiles that are driven off. Pollution of the environment is avoided by initially burning most of the volatiles and ultimately treating the exhaust gases before discharge to the atmosphere.

The processes for the treatment of scrap can advantageously be employed to increase the percentage of scrap that can be charged to a steelmaking operation or to any metallic melting operation which can avail itself of the use of scrap having carbon added thereto. For example, this process can be used to produce a feed for electric furnaces, open hearth furnaces, oxygen furnaces and foundry cupola operations, which can replace pig iron on a 1:1 or higher basis. In fact, because of its higher carbon value, the carbon-coated scrap provided by these processes is regarded as being more valuable than pig iron because it substantially decreases coke requirements.

Various of the features of the invention are set forth in the claims appended hereto.

What is claimed is:

1. A process for the pretreatment of solid, metallic, scrap steel destined for use in a metallic melting operation, which process comprises the steps of heating said scrap steel to a temperature of at least 800°F. to about 1,200°F. but below the fusion point of said scrap steel and contacting substantially the entire surface of said heated scrap steel with a liquid organic carbonaceous material so that the heat of said heated scrap steel causes said organic material to be pyrolyzed and thereby provide a strongly adherent coating which is at least about 95 percent carbon on substantially the entire surface of said scrap steel, said coating constituting at least about 2 percent by weight of the coated scrap steel.

2. The process in accordance with claim 1 wherein said coating is applied by immersion in a bath of liquid carbonaceous material which bath is maintained at a temperature of between about 200°F. and about 800°F.

3. Metallic steel scrap having a dull, substantially continuous carbonaceous coating thereon formed by the process of claim 1.

4. The process in accordance with claim 1 wherein said scrap steel is heated to a temperature at least about 1,200°F.

5. The process of claim 4 wherein said organic material is selected from the group consisting of tar, pitch, asphalt, bitumen and mixtures thereof.

6. The process in accordance with claim 4 wherein said carbonaceous coating material includes particulate carbon blended with said organic material.

7. The process in accordance with claim 4 wherein said coating is applied by spraying carbonaceous liquid onto said heated scrap steel.

8. A process in accordance with claim 7 wherein said coated scrap steel while still hot after pyrolysis is compressed to a compact form.

9. The process in accordance with claim 7 wherein said spraying is carried out in a controlled enclosure and wherein the volatiles given off by said pyrolysis are burned to aid in said heating step.

10. The process in accordance with claim 9 wherein said heating and spraying are carried out in a rotating kiln.

* * * * *